March 9, 1965 A. SALOTTI ETAL 3,172,937
FLAME CUTTING APPARATUS
Filed June 18, 1962 2 Sheets-Sheet 1
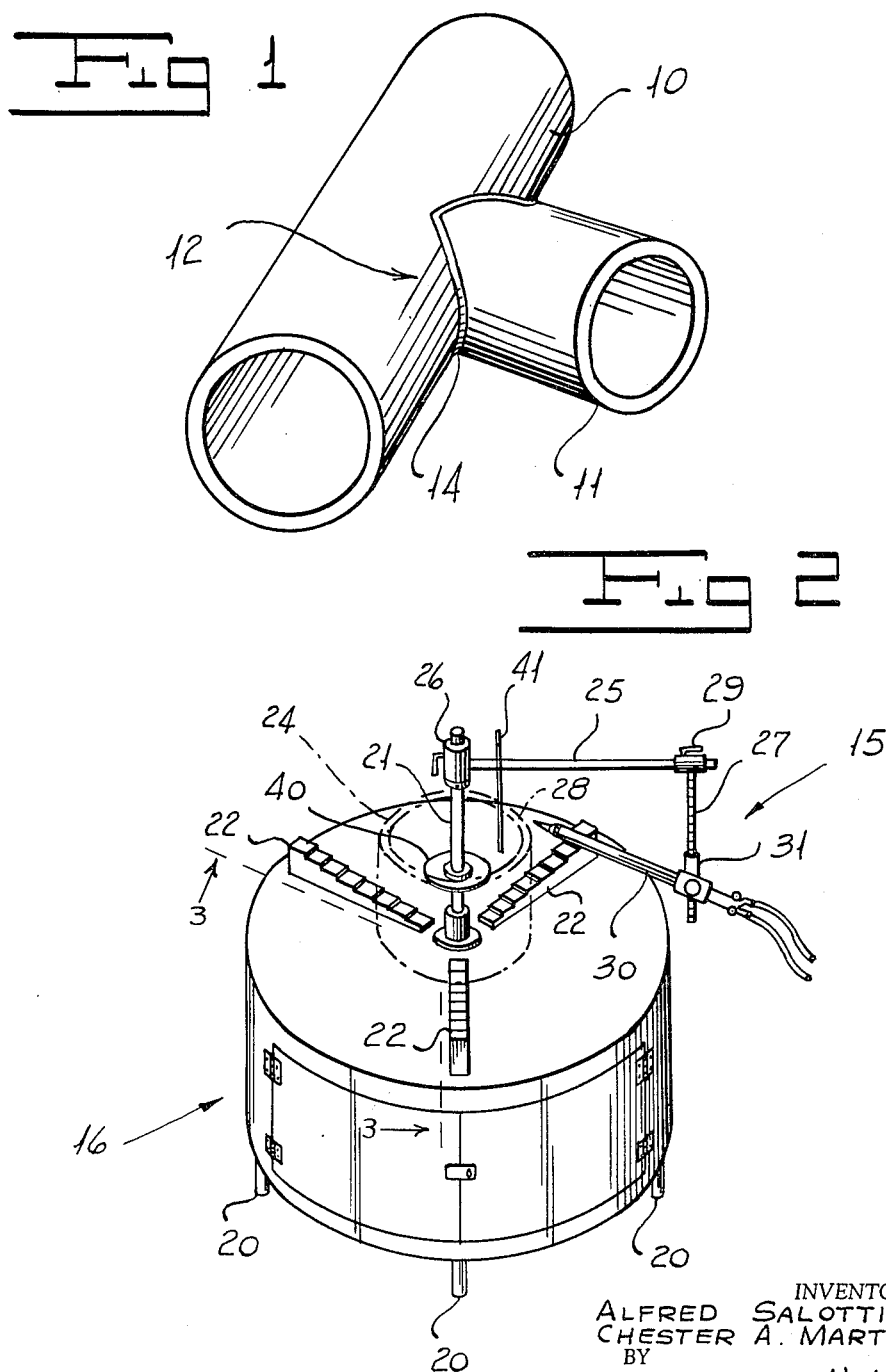
INVENTORS
ALFRED SALOTTI
CHESTER A. MARTELLO
BY
Alfred W. Vibber
ATTORNEY

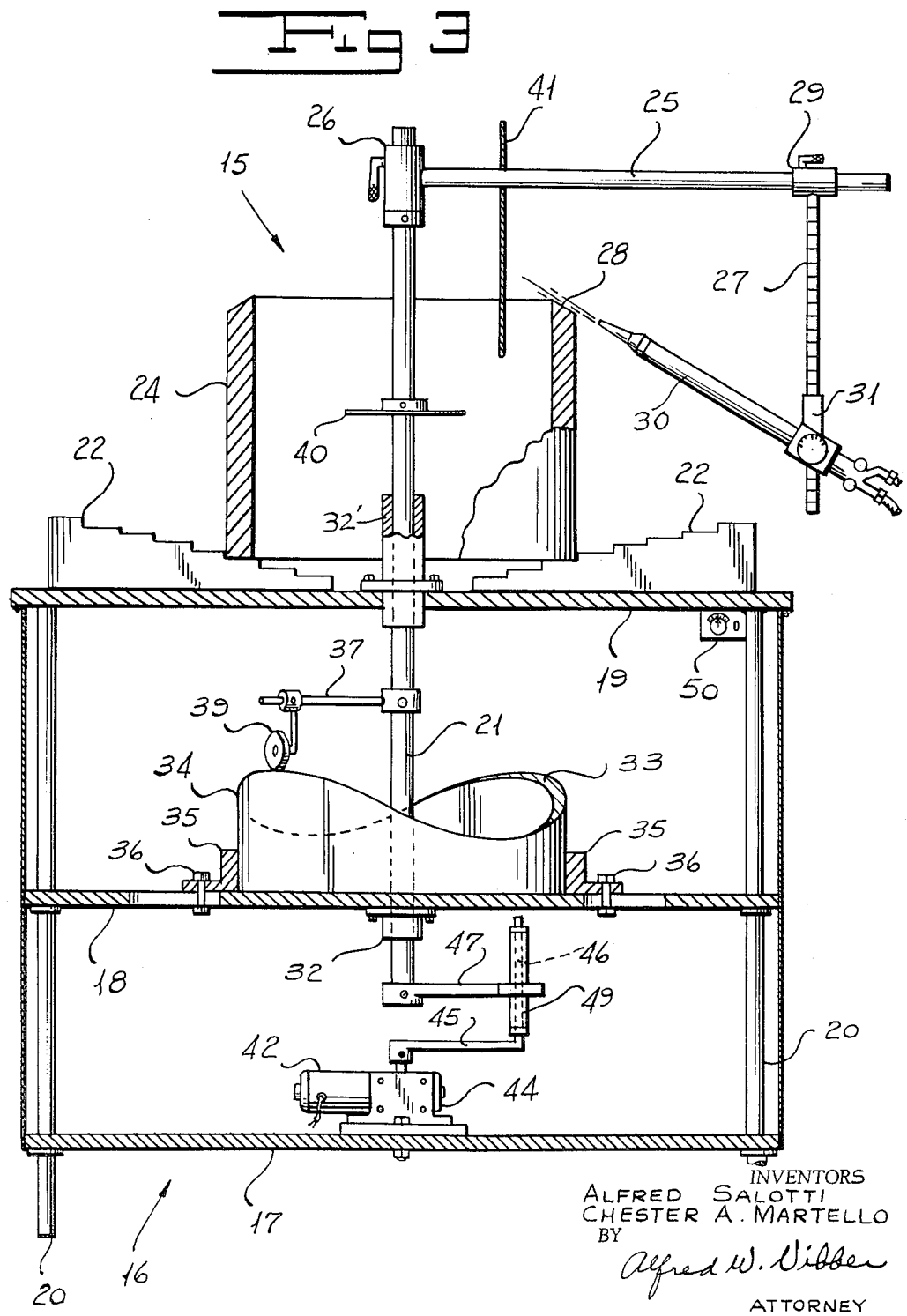

United States Patent Office 3,172,937
Patented Mar. 9, 1965

3,172,937
FLAME CUTTING APPARATUS
Alfred Salotti, Wood-Ridge, and Chester A. Martello, Clifton, N.J., assignors to Flexo-Flame Corporation of America, Paterson, N.J., a corporation of New Jersey
Filed June 18, 1962, Ser. No. 203,258
7 Claims. (Cl. 266—23)

This invention relates to apparatus for flame cutting, and in preferred embodiments thereof more particularly relates to apparatus for the peripheral flame cutting of articles of closed or rounded contour.

The apparatus of the invention is illustrated in its application to the shaping of the end of a pipe to be connected to another pipe at a fillet welded joint, such as a T joint, therebetween. Such joints are customarily formed, assuming that a first main pipe is already in place, by first making a hole in the wall of the first pipe at the location of the joint, such hole being no greater in diameter than the inner diameter of a second pipe which is to be joined to the first pipe. The end of the second pipe is then cut to the requisite saddle-shape, so that it accurately interfits with the outer side wall of the first pipe in the zone thereof surrounding the hole through the wall of the first pipe. It will be understood that the contour to which the end of the second pipe must be cut in order to make a satisfactory joint between the two pipes will vary, depending upon the diameters of the first and second pipes, such contour changing with differences in diameter of either the first or the second pipe.

Such shaping of the end of the second pipe has heretofore been accomplished by an essentially hand operation, an approximation of the required curvature of the end of the second pipe being drawn or scribed thereon by the operator, following which the operator makes the flame cut at the end of the second pipe by a hand held cutting torch. Not only is such operation unduly time-consuming, but the results are very apt to be inaccurate, so that the cut end of the second pipe does not properly interfit with the surface of the first pipe. If the contour of the cut end of the second pipe is so inaccurate that a portion or portions of the cut end lie spaced apart more than a prescribed maximum distance, the resulting weld will not pass inspeciton. The cut end of the second pipe must thereupon be reshaped by a further cutting operation, until such minimum accuracy of fit between the pipes is achieved.

Not only must the cut end of the second pipe interfit with the surface of the first pipe with the described minimum accuracy, but the cut end of the second pipe must have a bevel thereon throughout its extent of an angularity lying within a limited range if a satisfactory fillet welded joint is to result. The maintenance of the angle of the bevel within permissible tolerances while cutting the end of the second pipe to the requisite contour is difficult when the cutting operation is carried out by manually guiding the flame cutting torch.

The invention has among its objects the provision of a novel apparatus for the peripheral flame cutting of articles of closed or rounded contour.

A further object of the invention is the provision of apparatus of the type decsribed wherein the apparatus may be readily adjusted and changed to cut articles of different sizes and contours.

Yet another object of the invention, in a preferred embodiment thereof, is the provision of apparatus for the peripheral flame cutting of articles of closed or rounded contour which is automatic in operation, so as to perform the entire cutting operation without attention when the apparatus has been once set up and started.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in perspective of a fillet welded joint between a first and a second pipe connected at a T joint;

FIG. 2 is a view in perspective of an illustrative embodiment of apparatus made in accordance with the invention; and FIG. 3 is a view in vertical section through the apparatus of FIG. 2, the section being taken along the line 3—3 of FIG. 2, certain of the parts being shown in elevation.

Turning now to the drawings, there is shown in FIG. 1 a typical welded pipe joint 12 between a first pipe 10 and a second pipe or nipple 11. The end of pipe 11 at the joint 12 has been cut to the proper saddle-shaped contour in order closely to interfit with the zone of pipe 10 surrounding a hole (not shown) which has been formed through the sidewall of pipe 10. The end of pipe 11 has been cut with an outwardly open bevel of the desired angle, in order to receive welding metal with which the peripheral fillet weld 14 has been made between the pipes at the joint 12. After such joint has been formed, additional lengths of pipe may be joined end to end and to the pipe 11 in a conventional manner.

A preferred embodiment of flame cutting apparatus in accordance with the invention for cutting the end of pipe 11 at joint 12 to the proper contour, and for forming the required bevel upon such cut end, is shown in FIGS. 2 and 3, where it is generally designated by the reference character 15. Such apparatus includes a generally cabinet-shaped support 16 which includes a lower shelf or platform 17, an intermediate platform 18, an upper shelf or platform 19, and four legs 20 connected to the platforms in a conventional manner. A central vertical rotatable post 21 projects upwardly through upper platform 19, such post supporting a flame cutting torch 30 and being vertically reciprocated under the control of a cam or template, to be described, as the post 21 and the torch carried thereby rotates about the axis of the post 21 during a flame cutting operation.

The torch is shown in FIGS. 2 and 3 in the act of cutting the upper end of a short pipe or nipple 24 to the required contour and bevel. Pipe 24 is supported in vertical position on platform 19, and is held coaxial of post 21 by a plurality (three shown) of concavely stepped jaw-like members 22 which are angularly spaced around the post 21 coaxial therewith. The respective seats provided by members 22 are of such diameter as accurately to receive the lower ends of pipes or nipples of various diameters to be cut and to hold them coaxial of post 21.

A horizontal cross arm 25 is non-rotatably secured to the upper end of post 21 in a predetermined angular relationship with respect thereto by a releasable connector or fitting 26. Secured to arm 25 is a depending arm 27, a releasable connector or fitting 29 allowing the arm 27 to be suitably adjusted along the length of cross arm 25. The above-mentioned cutting torch 30 is secured to the arm 27 by a connector or fitting 31 which permits both the desired adjustment of the torch vertically of arm 27, and also permits the adjustment of and holding of the torch 30 at the desired angle relative to the axis of pipe 24. Thus the apparatus may be readily adjusted to yield optimum conditions of cutting of any pipe 24 which the apparatus can accommodate, as well as to provide a cut end 28 on pipe 24 having the desired angle of bevel around its entire periphery.

The post 21 is mounted in elongated vertical sleeves 32 and 32' secured to intermediate and upper platforms 18 and 19, respectively, such sleeves accurately maintaining the vertical alignment of the post while permitting it to reciprocate vertically and to turn about its axis. The turning of the post may be accomplished either manually, as by grasping the horizontal arm 25 outwardly of the torch and turning the arm at the required speed about the axis of post 21, or it may be accomplished automatically by power means to be described. The reciprocation of post 21, and thus of torch 30 as it turns about post 21, is under the control of a circular cylindrical face cam or template 34 which is secured to the intermediate platform 18 coaxial of post 21 and pipe 24.

In the embodiment shown, template 34 is in the form of a sleeve having an outer diameter which is the same as that of the pipe 24 being cut, the upper end surface 33 of template 34 being unbevelled but having a peripheral contour which is the same as that of the inner and outer peripheral edges of the end surface 28 to be cut on pipe 24. Template 34 is securely held coaxial of post 21 by a chuck mounted on intermediate platform 18, such chuck having a plurality of angularly spaced jaws 35. In the embodiment shown, jaws 35 of the chuck are secured to platform 18 by bolts 36, such bolts extending through slots in platform 18 which are disposed radially of post 21. Such chuck permits the ready exchange of one template for another, when a pipe 24 of a different size is to be flame cut. To permit template 34 readily to be assembled in the apparatus and disassembled therefrom, the template may be made in two similar diametrically divided parts, such parts when mounted in the apparatus being held together in accurate edge-engagement by the chuck jaws 35.

A radial arm 37 affixed to post 21 above template 34 carries at its outer end a roller 39 acting as a cam or template follower. Thus, in operation of the apparatus, roller 39 travels upon the upper edge of the template, causing the post 21 as it rotates to rise and fall in accordance with the contour of template 34, and thus causing torch 30 to cut pipe 24 along the required curved line. An adjustable stop collar 40 is affixed to post 21, as shown, to prevent the falling of post 21 below a desired level when the template 34 is being replaced. A flame shield 41 is desirably affixed to arm 25 inwardly of the upper end of pipe 24, to prevent impingement of the flame from the torch upon the upper end of post 21, connector 26, and the inner end of arm 25.

The embodiment of apparatus shown is motor powered. Thus a variable speed electric motor 42 having a speed reducing gear device 44 is provided for rotating post 21. The output shaft of gear device 44 has a crank arm 45 affixed thereto, there being an elongated vertically extending crank pin 46 affixed to the outer end of the crank arm. A crank arm 47 affixed to the lower end of post 21 has an outer end portion in the form of a sleeve 49 which receives crank pin 46. The engagement between sleeve 49 and crank pin 46 is such that the crank arm 45 drives crank arm 47 and thus post 21, while the post 21 and its crank arm 47 are free to reciprocate vertically under the control of template 34 and template follower 39. The motor 42 is under the control of a conveniently located switch and rheostat device 50, which combines the functions of starting and stopping the motor and of controlling the speed of the motor.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. Apparatus for flame cutting a peripheral zone of a hollow cylindrical body along a predetermined curved path, comprising a table-like support, said support having first and second broad horizontal supporting members spaced vertically one above the other, means on the upper one of said supporting members for fixedly holding the body with the axis of the body in a fixed line, a shaft journalled in the first and second supporting members and projecting axially through the cylindrical body, an arm means projecting outwardly from the shaft beyond the upper end of the body, a flame cutting torch supported on the outer end of said arm means, a template in the form of an annular cam fixedly secured to the other lower supporting member coaxially of the body, cam follower means connected to the shaft and engaging the cam to cause the shaft to be reciprocated as it rotates about its axis, and means to rotate the shaft whereby to rotate the torch about the axis of the body to cause the flame from the torch to traverse the periphery of the body.

2. Apparatus as defined in claim 1, wherein the body is in the form of a hollow circular cylinder, and the means for rotating said shaft comprises a motor affixed to the support, said motor being disposed beneath the lower supporting member and drivingly connected to the shaft.

3. Apparatus for flame cutting a peripheral zone of a cylindrical body along a predetermined curved path comprising a fixed support having an end face, a flame cutting torch, means rotatably to support the torch outwardly beyond said end face of the support and spaced from said face in a first direction, said means including bearing means on the support disposed with its axis generally normal to said end face of the support, a shaft mounted in the bearing for rotation and axial reciprocation relative thereto, said shaft having a portion projecting in said first direction beyond said end face of the support, and means mounting the torch on said projecting portion of the shaft for movement therewith, means on the support for fixedly holding said body on the support beyond said end face of the support in position to be cut by the torch and with the axis of the body aligned with the axis of the said shaft, means for rotating the shaft and torch about the axis of the body to cause the flame from the torch to traverse the periphery of the body, a template having a face with an annular portion in the form of a cam having the shape of said predetermined path of cut, means for mounting the template fixedly on the support spaced inwardly beyond said end face of the support in a second direction with the template coaxial of said shaft, and template follower means on the shaft contacting the cam end face of the template to cause the shaft and torch to reciprocate in said cutting path as they are rotated about the body.

4. Apparatus as claimed in claim 3, wherein the body is in the form of a hollow circular cylinder, the projecting portion shaft extends through the body coaxially thereof, and the means mounting the torch on the projecting portion of the shaft includes a generally radially directed arm connected to the shaft and lying outwardly beyond the outer end of said body.

5. Apparatus as claimed in claim 4, wherein the said end face of the support lies at the top of the support, is broad, and lies generally horizontal, wherein the means for holding the body on the support comprises means fixed to the support on the horizontal top surface thereof, and the template and template follower are located below said top surface of the support.

6. Apparatus as claimed in claim 5, wherein the means to rotate the shaft and torch comprises power means connected to the shaft end mounted on the support below the top surface thereof.

7. Apparatus as claimed in claim 6, wherein the power means comprises a motor, a first crank arm driven by the motor mounted to rotate coaxial of the shaft, a second, similar crank arm fixed to the shaft adjacent one end thereof, and an extended crank pin affixed to one of the crank arms and slidably connected to the other crank arm to maintain driving connection between the cranks as the shaft rotates.

References Cited by the Examiner
UNITED STATES PATENTS

| | | | |
|---|---|---|---|
| 2,448,089 | 8/48 | Duvall | 266—23 |
| 2,545,666 | 3/51 | Lonngren | 266—23 |
| 2,878,010 | 3/59 | Cink | 266—23 |

MORRIS O. WOLK, *Primary Examiner.*

JAMES H. TAYMAN, JR., *Examiner.*